United States Patent Office 3,249,452
Patented May 3, 1966

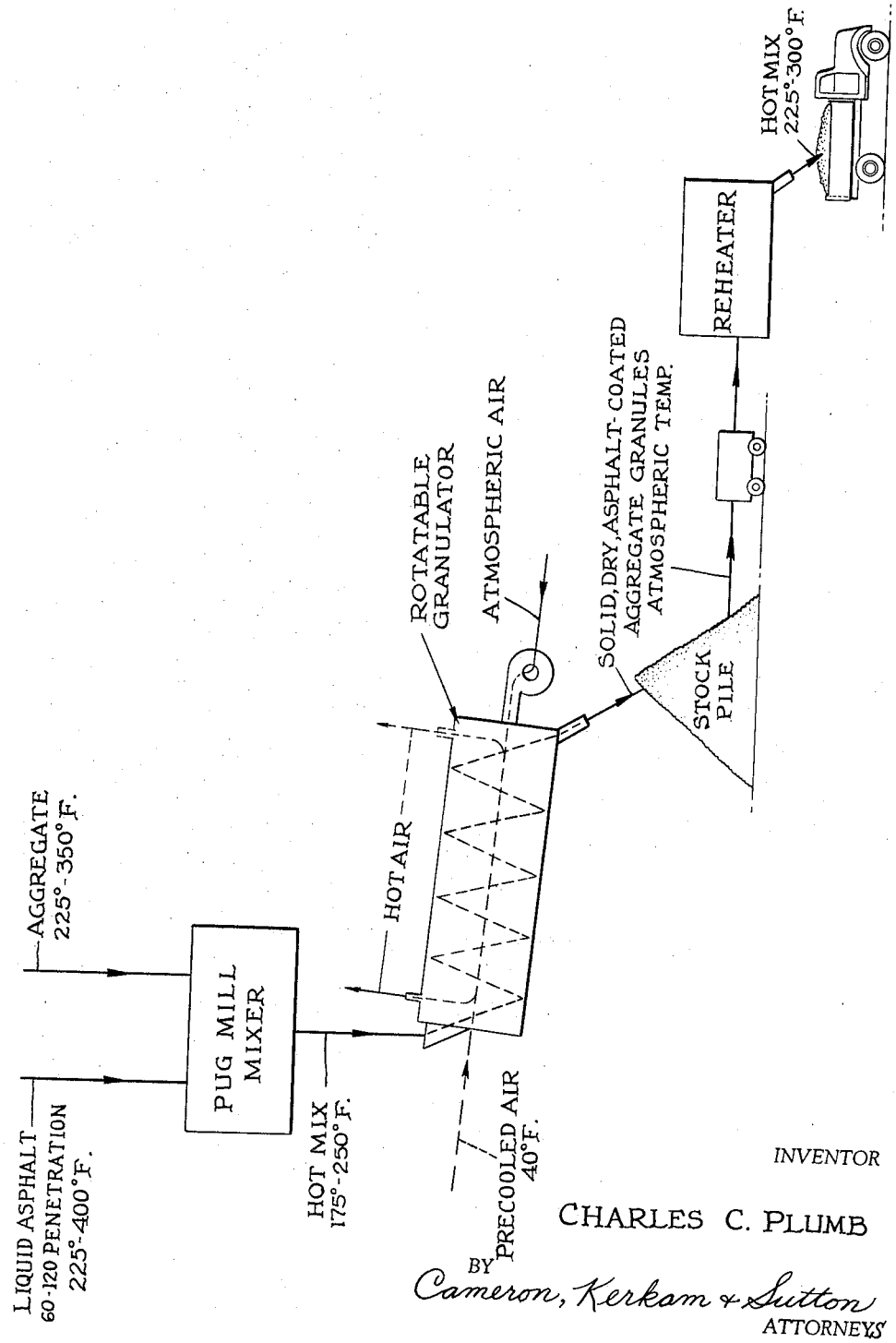

3,249,452
GRANULATED BITUMINOUS CONCRETE MATERIAL AND METHODS OF MANUFACTURING AND USING SAME
Charles C. Plumb, Cranston, R.I., assignor to GBC Corporation, Concord, N.H., a corporation of New Hampshire
Filed Nov. 13, 1961, Ser. No. 152,083
13 Claims. (Cl. 106—281)

This is a continuation-in-part of application Serial No. 74,451, filed December 8, 1960, now abandoned.

This invention pertains to a granulated bituminous concrete material adapted for use in surfacing highways, streets, airport runways, driveways, sidewalks, parking areas, roofs, etc., and to methods of manufacturing such a product and using the same for paving, roofing and similar purposes.

In the production of bituminous concrete, it has long been common practice to mix a heated aggregate of required specifications with hot asphalt or other bituminous cementing material at a permanently located central plant and to transport the hot mix in trucks from the plant to the site where the material is to be used. Because ordinary bituminous concrete must be laid before it has cooled, and since the central plant is often located a substantial distance away from the job site, it is usually necessary to employ a fleet of expensive, specially constructed trucks in order to transport the plant mix sufficiently rapidly to insure that it reaches the point of use while it is still hot enough to spread and compact in the usual manner.

In addition to the problem of rapid transportation, the present procedure is subject to a number of disadvantages from an economic standpoint due to the fact that the plant which produces the hot bituminous concrete mix can be operated only when there is an immediate demand for the product, and cannot be used for stockpiling the material for use at indefinite times in the future. Since plants of the character here involved are relatively large and expensive to build, the inability to operate them at times when bad weather or other circumstances produce no demand for the hot material results in an economic loss because a large investment must then stand idle. At other times, when there is an unusually heavy demand for the product, it is necessary to operate the plant on an overtime basis with a consequent increase in labor cost. These and other factors contribute to the relatively high cost of paving and like materials as presently manufactured.

The principal object of the present invention is to provide improved methods of manufacturing, handling and using bituminous concrete materials which will overcome the deficiencies and economic disadvantages of the procedures heretofore followed in the industry, and will enable more efficient operation of and increased production by present-day mixing plants.

Another object is to provide a novel form of bituminous concrete material which is capable of producing asphalt paving mixtures of substantially greater stability in relation to their density than can be produced from standard hot mixes, and with no adverse effect on the penetration value of the asphalt cement.

To attain these objectives, a method has been devised for transforming the hot conglomerate mix normally produced by a conventional mixing plant into a cool granular state, without the use of chemical or other additives, so as to provide a product which can be readily handled, stored in stockpiles for subsequent use, shipped in bulk by boat or railroad car to areas remote from sources of usable aggregates and from permanent mixing plants, or packaged in bags or other containers for use by property owners in covering or repairing driveways, sidewalks, roofs and other surfaces. In order to use the product for paving or similar purposes, it is only necessary to reheat the granular material to substantially the same temperature as that of the usual hot mix, an operation which can be readily performed at any desired location, particularly at or near the job site, by the use of heaters of various types, portable as well as permanently installed, which are substantially less expensive than the equipment normally associated with a bituminous concrete plant.

It will be evident that such a product, which is novel per se, can be manufactured and stored by the plant operator when there is no demand for immediate delivery by truck to a job in progress, and will also enable the operator to satisfy peak demands without overtime operation. Furthermore, the product thus provided and the methods by which it is made and used make it possible for contractors to purchase and stockpile bituminous concrete material for use on jobs which they would otherwise be unable to undertake without making the large financial investment required for the erection of a permanent central plant. Stockpiling also permits contractors to make firm bids on future construction because the cost of the basic material is known.

A further object of the present invention is to produce colored granules of bituminous coated aggregate of novel character which can be used for making colored pavements, driveways, walks and the like, and for forming colored designs on these and various other surfaces, including roofs and earthen areas, such as garden borders.

These and other objects and advantages of the invention will appear more fully upon consideration of the detailed description which follows and the accompanying drawing which diagrammatically illustrates a preferred embodiment of the method of the present invention. In this connection, it is to be expressly understood that this description and drawing are exemplary only and are not to be construed as defining the limits of the invention, for which latter purpose reference should be had to the appended claims. Since the invention is especially well adapted to manufacture of the product commonly termed asphalt concrete which is produced in so-called asphalt mix plants, the following disclosure will be directed primarily to this particular application of the invention. By so doing, however, it is not intended to limit the scope of the invention to asphalt concrete because it will be obvious that it has equal utility in the production of other types of bituminous cement-aggregate compositions.

In manufacturing granular asphalt concrete material in accordance with the method of the present invention, the initial steps of the procedure followed are similar to those employed in producing hot asphalt-aggregate mix in conventional asphalt mix plants, except that the temperatures of the aggregate and the asphalt may be, and preferably are, substantially less than those normally required, with a consequent saving in heating costs. The aggregates used in the present process may be of any suitable character, such as stone, gravel, sand, crushed rock, slag, stone dust, limestone and the like, graded to proper specifications, while the bituminous constituent is preferably asphalt cement of from about 60 to about 120 penetration, i.e., a soft asphalt cement, or an asphalt emulsion. Tar or other bituminous cementing material may also be used.

The aggregate is delivered from the storage bin by conveyor to a rotary drum-type kiln of known construction wherein it is dried and heated to a temperature of from about 225° to about 350° F., preferably not more than 250°. From the outlet end of the kiln, the aggregate is elevated by another conveyor and delivered to a vibrating screen classifier or separator which distributes the aggregate particles into bins according to size. When it is desired to make a batch of hot asphalt concrete mix, amounts of aggregate from the several bins, properly proportioned to meet the grade specifications, are supplied to a pug mill mixer as indicated in the drawing, a normal charge being from 2,000 to 4,000 pounds. After the aggregate has been dry mixed for a period of approximately 15 seconds, there is delivered to the pug mill from a weigh bucket a measured amount of liquid asphalt which has also been heated to a temperature of from about 225° to about 400° F., the quantity of asphalt being such as to provide a bitumen content in the mix of from 3.5 to 8% by weight of the aggregate, depending upon the use for which the finished product is intended. In the event that the mix is to be used for surfacing roofs or the like, the bitumen content may be reduced to as low as about 0.5%, and the aggregate will be graded according to specification. After the asphalt is added to the dry mixed aggregate in the pug mill, mixing continues for about 45 seconds more, making a total mixing time of approximately one minute.

If conventional practice were to be followed, the mixed batch would be discharged from the pug mill into a truck for transportation to the job site, and the temperature of the batch would normally be 300° F. or higher, depending upon the length of the haul, in order to insure laying while the mix is still hot. In the method of the present invention, however, it is possible to use a substantially lower temperature and to discharge the mix from the pug mill at a temperature less than 300° F., preferably from about 175° to about 250° F. Accordingly, it is preferred to reduce the temperature to which the aggregate is heated prior to mixture to the lower portion of the range above mentioned, i.e., to about 250° F., and to use asphalt at a temperature of about 225° to 350° F. By thus reducing the temperature of the aggregate in comparison with standard commercial procedures, the asphalt suffers less "shock" and loss of volatiles upon contact with the aggregate, thereby minimizing the drop in penetration value of the asphalt.

The method of the invention differs from prior procedures in that the hot mix leaving the pug mill is transported to a cooling device wherein it is transformed from a conglomerate mass of hot asphalt coated aggregate particles, wherein the wet asphalt cement has a tendency to cause the particles to lump up and adhere to one another, into a discrete mass of cool, relatively dry, non-adherent granules. Although it is usually expedient to cool and granulate the hot mix promptly after it is discharged from the pug mill, the granulating operation may be delayed for as long as several hours without detriment, provided the temperature of the mix remains above 175° F. until it enters the cooler. The temperature of the mix at the beginning of the cooling step should preferably be within the range from about 175° to about 250° F.

According to one embodiment of the invention, the hot mix is discharged from the pug mill onto a belt conveyor which delivers it into one end of a rotary drum-type cooler, which may be similar in mechanical construction to the aggregate kiln. The cylindrical drum or shell of the cooler, which may be from 12 to 30 feet in length and have a capacity of from one to six tons of mix per minute, is rotatably mounted with its axis inclined downwardly away from the end into which the hot mix is introduced, and is provided internally with a number of flights or blades which, as the drum rotates, lift the asphalt coated aggregate to the top of the drum and then cause it to fall in shower or cascade fashion back into the bottom of the drum, the inclination of the drum axis serving to feed the material from the inlet to the outlet end thereof. The outlet end of the drum is provided with means for supplying thereto air at or below atmospheric temperature which is forced by a blower through the drum in an axial direction countercurrent to the direction of movement of the asphalt concrete mix, and which is exhausted from the drum, with the aid of an exhaust fan, if desired, through a stack connected to the end of the drum at which hot mix is introduced. The air is supplied to the drum in such volume and at such velocity as to both cool the mix to atmospheric temperature and also produce separation thereof into granulated particles as the mix is repeatedly lifted and showered down through the air stream, the object being to remove substantially all of the heat from the aggregate so that, when it is discharged from the cooler in granular form, the granules are at atmospheric temperature.

Assuming that air is supplied to the drum at atmospheric temperature, that the hot mix is delivered into the drum at an initial temperature of from about 175° to about 250° F., and that the drum is rotated at a speed of from about 8 to 18 r.p.m., the desired cooling and granulation can be effected by blowing air into the drum at a rate of from 5,000 to 50,000 cubic feet per minute. For example, 35,000 cubic feet per minute of air at a temperature of approximately 70° F. will suffice to cool and granulate two tons per minute of asphalt concrete mix having a temperature of about 250° F. at the inlet of the drum. If desired, a small amount of water may be added to the cooling air in the form of a finely divided suspension to assist in cooling the mix. In this connection, it should be noted that the granular asphalt concrete material of the present invention is not porous and does not absorb water, and that any water which may be deposited on the outside surfaces of the granules will decrease the stickiness of the asphalt coating and thereby assist in keeping the particles separated.

Alternatively, the cooling air supplied to the drum may itself be precooled below atmospheric temperature, for example, to about 40° F., in which case the air is preferably blown into the drum at the same end as the hot mix inlet so as to flow through the drum in the same direction as the latter.

It will be understood that other types of cooling devices may be used instead of the rotary drum-type cooler above described. For example, the cooler may be similar in construction to known forms of continuous mixers having a stationary trough open at the top and an axially extending array of rotatable paddles which both churn the mix and feed its axially along the trough, or may comprise an inclined vibrating screen. With coolers of these types, the inlet end can be positioned beneath the pug mill so that the hot mix may pass directly from the latter into the cooler. Such coolers may also be provided with an overhead arrangement of nozzles for spraying water on top of the material to assist in cooling and in maintaining the particles separated from one another.

The capacity of the cooling apparatus may be increased either by operating two or more coolers in parallel, or by using water to precool the hot mix during its movement from the pug mill to the cooler. For example, the lower end of an inclined belt conveyor delivering at its upper end into the cooler may be positioned in a tank of circulating water beneath the pug mill, so that the hot mix may drop from the pug mill through the water onto the lower end of the conveyor belt, and the excess water may drain back into the tank along the belt as the mix is carried upwardly toward the cooler. In such an installation, the temperature of the hot mix may be reduced by about 50° F. between the pug mill and the entrance to the cooler, thereby enabling an increase in the speed of rotation of the cooler drum and a consequent decrease in the time of transit of the material through the cooler. In another modification, precooling of the hot mix can be effected by positioning above and along the length of the conveyor leading to the cooler spray nozzles from which water may be showered onto the mix en route from the pug mill to the cooler.

As a result of the mechanical agitation and the showering or cascading through the air stream in the cooler, the material is thoroughly cooled and separated and issues from the cooler in the form of a discrete mass of cool, relatively dry, asphalt coated granules of aggregate. Although the granules may be of different sizes, consisting of small particles stuck together with the asphalt cement, this condition is not detrimental because, when the granular material is prepared for use by reheating as hereinafter described, the asphalt softens and the particles are readily separated.

When the asphalt concrete material is discharged from the cooling apparatus in granulated form, it may be delivered in any suitable manner, as by conveyor or truck, to a stockpile or other storage facility, or it may be handled in bulk like aggregate or other granular solids and shipped by truck, railway car or boat to any desired point. Since the product is nonhygroscopic, it may also be packaged in bags, drums or other containers for shipment and sale in relatively small quantities. It may also be stored indefinitely under water, as might be desirable at points where the bed of a stream or other body of water would be an advantageous storage location.

In order to use the bituminous concrete product of the present invention for paving or other purposes, it is only necessary to reheat the granules to a temperature sufficient to soften the asphalt so that the material may be spread and compacted in the usual manner. In general, the granulated product is reheated to substantially the same temperature as that at which hot asphalt mix is normally discharged from the pug mill at a conventional manufacturing plant, i.e., within the range from about 200° to about 400° F. However, in view of the fact that the reheating equipment may be independent of the asphalt mix plant and can be located either at or relatively close to the job site, thereby materially reducing the distance which the material has to be hauled in hot condition, temperatures within the lower part of the range will usually suffice. For example, it should not normally be necessary to reheat the granular material to a temperature above the range of from about 225° to about 300° F. The reheated material is discharged from the reheater directly into trucks for transport to the job site where it may be laid in conventional manner.

The reheater may be of any suitable construction, and may be either portable or permanently installed. For example, if a batch type heater is preferred, it may comprise a stationary box or receptacle of appropriate size and shape having a charging door in the top, a discharge hopper at the bottom, and a nest of heating tubes inside the receptacle through which hot oil is circulated from and to a boiler of appropriate character. In order to prevent the granulated material from bridging the spaces between adjacent heating tubes, means may be provided for vibrating the tubes during the reheating operation. By circulating oil through the tube nest at an initial temperature of from about 400° to about 450° F., the granular material can be reheated to the desired temperature in from 15 to 30 minutes. If desired, steam or hot gas may be used as the reheating medium, although the use of steam may present a problem of obtaining a sufficiently high temperature unless high pressure equipment is utilized. It will also be obvious that, if the volume of material to be reheated is sufficiently great, a continuous type heater could be used instead of batch type equipment.

One of the unusual, and not fully understood, results of the method above described is that the granular material, when reheated, has a considerably higher stability value, according to the Marshall Test method, than ungranulated hot mix material of the same composition made in the usual manner. Consequently, an asphalt paving mixture of any specified stability can be produced by the method of the present invention with a less dense, less expensive aggregate than would be required for the conventional method. Asphalt recovered from the granulated product has also been found to have undergone no more than a normal drop in penetration value.

In this connection, laboratory tests have indicated that the stability of the granulated material produced by the method of the present invention has a Marshall stability value of from 15 to 40% greater than a bituminous concrete mix containing the same grades and percentages of aggregate and asphalt made by the conventional procedure. For example, in one test a batch of bituminous concrete meeting the Pennsylvania Department of Highways specification for ID-2 wearing surface, embodying an asphalt cement having a penetration range of 85–100, was produced in a standard mix plant in accordance with standard commercial practice except that the temperature of the mix on discharge from the pug mill was only about 250° F., which is 50° lower than the temperature at which such material is normally discharged. Part of the batch was then cooled and converted into granular form by the method above described, while another part was subjected immediately to the Marshall stability test, and was also extracted for the purpose of determining the penetration value of the asphalt. The stability value of the latter part of the batch was 1430 pounds with a flow value of 23, while the penetration value was 78. After stockpiling for several days, the granulated portion of the batch was reheated for one-half hour at a temperature of 300° F. before being tested for stability, and was found to have a stability value of 2000 pounds with a flow value of 20. Extractions were also made on the granular material both before and after reheating, and on the Marshall stability test specimens which were made from the ungranulated material, with resulting penetration values of 66, 65 and 64, respectively. This test thus showed a 39.8% increase in stability with no adverse effect on penetration as a result of the granulating procedure.

Another advantage of the method of the present invention resides in the fact that it is capable of producing bituminous concrete material of any desired color using aggregates which are normally considered to be of little commercial value.

Most stone crushing plants, after screening the crushed stone into various commercial sizes, have a residual product, commonly called stone screenings or stone dust, consisting of relatively fine particles ranging in size from No. 4 to No. 200 mesh, which is sometimes usable as a filler, but often is discarded as worthless. Heretofore, it has been considered impossible to produce an acceptable bituminous concrete using only fine aggregate of such small sizes. However, it has been found that, by processing such material according to the method of the present invention, it can be mixed with asphalt and converted into granular form, and thereafter provided with a pigmented coating so as to produce colored granules of bituminous coated aggregate useful for a number of different purposes.

In preparing colored granular bituminous concrete material in accordance with the invention, aggregate consisting essentially of relatively fine particles of such sizes as will pass sieves Nos. 4 through 200 is mixed with from 1.5 to 5% of liquid asphalt having a penetration range of about 40–85, and is then cooled and granulated by substantially the same procedure as that described above, except that the aggregate and the asphalt are preferably heated before mixing to temperatures of from 50° to 100° F. higher than those employed when making granular bituminous concrete from the usual commercially graded aggregates; that is, the aggregate is preferably dried and heated to a temperature of from about 325° to about 400° F. and is mixed with asphalt having a temperature of from about 300° to about 450° F. During the mixing and granulating procedures, the fine aggregate particles agglomerate to some extent with the result that most of the granules are of substantially larger size than the starting aggregate. After the material has been cooled and granulated, the granules are coated with paint of any desired color by agitating them, as by means of a vibrating plate or screen, in the path of a spray of paint which may be produced by one or more nozzles. Although the paint used may be of any suitable composition, as long as it does not contain oil or any other vehicle or thinner which is a solvent for asphalt, water-based paints have been found well suited for the purposes of the invention. In this connection, it is noteworthy that material which has been granulated by the method of the present invention and then colored with a water-based paint will not lose its colored coating when exposed to the weather, and that the color will not run or strip off even under prolonged contact with water.

The colored granular bituminous concrete material thus produced is usable for various purposes, including the production of colored pavements, driveways, walks and the like. For example, the granules may be distributed on top of any freshly laid bituminous concrete surface, or may be spread over the surface of an existing driveway or walk, after the latter has been heat-softened, and then rolled into the softened surface. The material can also be used in loose form for making colored designs with the aid of outlining forms on any suitable supporting surface, such as a flat roof on which it is desired to display an advertising sign to be observed from above. Other uses of this material will readily suggest themselves to those skilled in the art, it being understood that in all cases the colored granules should be applied in cold or unreheated condition.

There is thus provided by the present invention new and improved methods of manufacturing bituminous concrete material and of using that material for paving and similar purposes which are more efficient and more economical than the procedures heretofore employed, particularly in the highway construction industry. The invention also provides a bituminous concrete material of unique physical characteristics which requires no chemical or other additive for its production, and is in such a state that it can be handled, shipped and stored in ways hitherto not possible of application to similar material of conventional form. Use of the methods and product of the invention will result in increased production by and more economic operation of present-day asphalt mix plants, and will also enable contractors who use bituminous concrete in their work to handle jobs, which under previous conditions, they would be unable to undertake. Since the granulating method herein disclosed consistently increases stability without resorting to the usual practice of using costly fillers to increase the density of the material, this method also enables the production of pavement of any specified stability value by using less dense, less expensive aggregates.

Although certain examples of the procedural steps of the method and of the types of apparatus usable for carrying out the method have been described above, it will be obvious that the invention is not limited to these illustrative examples, but that various changes, which will now suggest themselves to those skilled in the art, may be made in both the method and the apparatus without departing from the inventive concept. It will also be evident that the product may incorporate various aggregates and bituminous substances which in turn will result in variations in size, density, hardness and other physical characteristics of the granulated product which is one of the features of the invention.

What is claimed is:

1. A method of producing a granulated bituminous concrete material comprising the steps of forming a heated mixture consisting of mineral aggregate and a soft asphalt cement in liquid form, said mixture having a temperature in excess of 175° F., the quantity of said cement being such as to provide a bitumen content in the mixture of from about 0.5% to about 8% by weight of the aggregate, and cooling said heated mixture to approximately atmospheric temperature by intimately contacting the particles thereof with a flowing stream of air having an initial temperature not greater than atmospheric temperature while agitating the mixture so as to maintain the latter in particulate form, whereby said mixture is converted into a mass of discrete non-adherent bituminous coated aggregate granules.

2. A method as claimed in claim 1 wherein the temperature of said heated mixture at the beginning of the cooling step is within the range from about 175° to about 250° F.

3. A method as claimed in claim 1 including the step of precooling said heated mixture by contact with water.

4. A method as claimed in claim 1 including the additional step of applying to the bituminous coated aggregate granules a coating of paint free from solvents for asphalt.

5. A method as claimed in claim 4 wherein the aggregate consists essentially of particles sized to pass sieves Nos. 4 through 200, and the pigmentary coating consists of a water-based paint.

6. A method of producing a granulated bituminous concrete material comprising the steps of forming a bituminous concrete mix consisting of mineral aggregate and an asphalt cement of from about 60 to about 120 penetration, said mix having a temperature within the range from about 175° to about 300° F., the quantity of said cement being such as to provide a bitumen content in the mix of from about 0.5% to about 8% by weight of the aggregate and repeatedly lifting and showering portions of said mix downwardly by gravity through a substantially horizontally flowing stream of air having an initial temperature not greater than atmospheric temperature until said mix is cooled to approximately atmospheric temperature and is converted into a mass of non-adherent granules of bituminous coated aggregates.

7. A method of producing a granulated bituminous concrete material consisting of the steps of forming a heated mixture of mineral aggregate and asphalt cement, the quantity of said cement being such as to provide a bitumen content in the mixture of from about 0.5% to about 8% by weight of the aggregate, passing said heated mixture through a cooling zone in a generally horizontal direction, passing through said zone in a generally horizontal direction a stream of air having an initial temperature upon entry into said zone which is substantially less than the temperature of said heated mixture upon entry into said zone, and repeatedly lifting and showering portions of said mixture downwardly through said air stream to cool said mixture and separate the same into a mass of discrete non-adherent bituminous coated granules of aggregate.

8. A method as claimed in claim 7 wherein the temperature of said heated mixture upon entry into said cooling zone is from about 175° to about 250° F., the initial temperature of said air stream is approximately atmospheric temperature, and the direction of flow of said air stream through said zone is opposite to the direction of movement therethrough of said mixture.

9. A method as claimed in claim 7 wherein the initial temperature of said air stream is below atmospheric temperature and the direction of flow of said air stream through said cooling zone is the same as the direction of movement therethrough of said mixture.

10. A method of producing a granulated bituminous concrete material comprising the steps of forming a heated mixture consisting of mineral aggregate and a soft asphalt cement in liquid form, the quantity of said cement being such as to provide a bitumen content in the mixture of from about 0.5% to about 8% by weight of the aggregate, passing said heated mixture through a substantially horizontal cylindrical cooling drum in a generally axial direction, passing axially through said drum a stream of air having an initial temperature upon entry into said drum not greater than atmospheric temperature, and repeatedly lifting and showering portions of said mixture downwardly through said air stream to cool said mixture and separate the same into a mass of discrete non-adherent bituminous coated granules of aggregate.

11. A method as claimed in claim 10 wherein the direction of flow of said air stream through said cooling drum is countercurrent to the direction of movement therethrough of said mixture.

12. A method of preparing a bituminous concrete material for use in paving and like purposes comprising the steps of forming a hot mass of bituminous coated mineral aggregate particles having a temperature of from about 175° to about 300° F., the bitumen content of said mass being from about 0.5% to about 8% by weight of the aggregate, converting said hot mass to a cool granular state by intimately contacting the particles thereof with a flowing stream of air having an initial temperature not greater than atmospheric temperature, while agitating the mass so as to maintain the latter in particular form storing said mass in granular state at atmospheric temperature until needed for use, and then reheating said mass in granular state to a temperature within the range from about 225° to about 300° F.

13. A method of preparing a bituminous concrete material for use in paving and like purposes comprising the steps of forming a heated mixture of mineral aggregate and asphalt cement having a temperature in excess of 200° F., the quantity of said cement being such as to provide a bitumen content in the mixture of from about 0.5% to about 8% by weight of the aggregate, precooling said heated mixture by contact with water, further cooling said mixture to approximately atmospheric temperature by contact with a flowing stream of air having an initial temperature not greater than atmospheric temperature while agitating the mixture so as to maintain the latter in particulate form, whereby said mixture is converted into a discrete mass of non-adherent bituminous coated aggregate granules, storing said mass in granular state at atmospheric temperature until needed for use, and then reheating said mass in granular state to a temperature in excess of 200° F.

References Cited by the Examiner

UNITED STATES PATENTS

| | | | |
|---|---|---|---|
| 2,017,632 | 10/1935 | Moody | 106—281 |
| 2,152,798 | 4/1939 | Fuller | 106—31 |
| 2,356,870 | 8/1944 | Miller | 106—282 |
| 2,444,413 | 7/1948 | Weston. | |
| 2,871,774 | 2/1959 | Johnson | 94—23 |
| 2,886,459 | 5/1959 | Lajoie | 106—282 |
| 2,977,864 | 4/1961 | Pullar | 94—22 |

ALEXANDER H. BRODMERKEL, *Primary Examiner.*

JOSEPH REBOLD, MORRIS LIEBMAN, *Examiners.*